United States Patent [19]

Rosthauser et al.

[11] Patent Number: 5,358,997
[45] Date of Patent: Oct. 25, 1994

[54] REACTIVE AQUEOUS POLYUREA DISPERSIONS PREPARED BY AN EMULSION POLYMERIZATION PROCESS

[75] Inventors: James W. Rosthauser, Glen Dale; Robin E. Tirpak, Wheeling, both of W. Va.

[73] Assignee: Miles Inc., Pittsburgh, Pa.

[21] Appl. No.: 879,828

[22] Filed: May 7, 1992

[51] Int. Cl.$^5$ .......... C08J 3/20; C08K 3/20; C08L 75/00
[52] U.S. Cl. .......... 524/591; 524/589; 524/590; 524/839
[58] Field of Search .......... 524/589, 591, 839, 590

[56] References Cited

U.S. PATENT DOCUMENTS

| | | | |
|---|---|---|---|
| 3,479,310 | 11/1969 | Dieterich et al. | 260/29.2 |
| 3,696,498 | 10/1972 | Leontaritis et al. | 29/424 |
| 4,066,591 | 1/1978 | Scriven et al. | 260/29.2 TN |
| 4,092,286 | 5/1978 | Noll | 260/29.2 TN |
| 4,408,008 | 10/1983 | Markusch | 524/591 |
| 4,663,415 | 5/1987 | Grögler et al. | 528/61 |
| 4,757,105 | 7/1988 | Kopp et al. | 524/714 |
| 4,764,553 | 8/1988 | Mosbach et al. | 524/591 |
| 5,157,074 | 10/1992 | Metzger et al. | 524/589 |
| 5,212,230 | 5/1993 | Tirpak et al. | 524/589 |
| 5,236,994 | 8/1993 | Markusch et al. | 524/589 |

FOREIGN PATENT DOCUMENTS 083232 7/1983 European Pat. Off. .

Primary Examiner—Paul R. Michl
Assistant Examiner—P. Niland
Attorney, Agent, or Firm—Joseph C. Gil; Thomas W. Roy

[57] ABSTRACT

The present invention is directed to a process for the preparation of an aqueous polyurea dispersion containing blocked isocyanate groups and unreacted isocyanate-reactive groups by (I) dispersing in water
  a) a polyisocyanate
  b) a monofunctional blocking agent which is more reactive with isocyanate groups than water and
  c) an amine component II) reacting the polyisocyanate with components b) and c) to form an aqueous polyurea dispersion.

16 Claims, No Drawings

5,358,997

REACTIVE AQUEOUS POLYUREA DISPERSIONS PREPARED BY AN EMULSION POLYMERIZATION PROCESS

BACKGROUND OF THE INVENTION

1. Field of the Invention

The present invention is directed to a process for the preparation of aqueous polyurea dispersions which contain blocked isocyanate groups and chemically incorporated isocyanate-reactive groups, have improved stability in water and are prepared by the emulsion polymerization process, and to the aqueous polyurea dispersions prepared by this process.

2. Description of the Prior

Aqueous polyurethane dispersions are known and are generally prepared by reacting a polyisocyanate with a high molecular weight polyol and low molecular weight chain extender components including components which provide hydrophilicity to the polyurethane. In these known processes, the polyisocyanate is initially reacted with the high molecular weight polyol to form an NCO prepolymer either in the melt or in the presence of an organic solvent prior to the introduction of water.

In U.S. Pat. No. 3,479,310 the NCO prepolymer is chain extended to form a linear polyurethane which is then mixed with an organic solvent prior to the addition of water. In U.S. Pat. Nos. 4,066,591 and 4,408,008 the NCO prepolymers are mixed with a solvent, dispersed in water and then chain extended with low molecular weight polyamines.

Accordingly, even though the chain extension step may be conducted in either the organic or the aqueous phase, the reaction between the polyisocyanate and the high molecular weight polyol is not conducted in the presence of water in either process. Further, in both processes organic solvents are necessary to reduce the viscosity of the fully reacted polyurethane or the NCO prepolymer prior to dispersing them in water.

An object of copending application, U.S. Ser. No. 07/677,011, filed Mar. 28, 1991 now U.S. Pat. No. 4,212,230, was to provide a method for preparing aqueous polymer dispersions which did not require the use of organic solvents to reduce the viscosity of fully reacted polyurethanes or NCO prepolymers and which could be conducted using readily available, simple mixing equipment. In accordance with this application an aqueous polyurea dispersion was prepared by emulsion polymerization, i.e., a polyisocyanate was dispersed in water and subsequently reacted with a high molecular weight polyamine. In this manner the need for solvents to disperse NCO prepolymer or fully reacted polyurethanes was avoided.

One of the disadvantages of this process is that the polyurea dispersions do not remain stable for more than a few hours. This becomes a problem if the dispersions cannot be prepared at the site where they will be used, which is often the case. This disadvantage was overcome in copending application, U.S. Ser. No. 07/877,686, by blending the high molecular weight polyamine with a low molecular weight polyamine containing an anionic group. The additional hydrophilicity of the anionic group improved the stability of the polyurea dispersions.

However, the aqueous polyurea dispersions of this latter copending application also suffer from a disadvantage in certain applications which require a reactive system such as the binding of fiberglass. In order to adequately bind fiberglass using existing processes and production equipment, it is necessary for a polyisocyanate polyaddition reaction to occur at the elevated temperatures employed for the binding operation. Because the aqueous polyurea dispersions of the copending applications are fully reacted, they are not suitable for binding fiberglass using established production methods.

Accordingly, it is an object of the present invention to provide reactive aqueous polyurea dispersions which are suitable for use as fiberglass binders and which possess improved storage stability and do not sacrifice any of the valuable properties provided by the aqueous polyurea dispersions described in the copending applications.

This object can be achieved in accordance with the present invention as set forth hereinafter.

SUMMARY OF THE INVENTION

The present invention is directed to a process for the preparation of an aqueous polyurea dispersion containing blocked isocyanate groups and unreacted isocyanate-reactive groups by I) dispersing in water
  a) a polyisocyanate which has an average functionality of 1.5 to 4.0 and an isocyanate content of at least 12% by weight,
  b) 10 to 70 equivalent percent, based on the isocyanate groups of component a), of a monofunctional blocking agent which is more reactive with isocyanate groups than water and
  c) an amine component containing
    i) 2 to 55 equivalent percent of a polyamine having at least two primary and/or secondary amino groups and a molecular weight of at least 1000,
    ii) 5 to 70 equivalent percent of a polyamine having at least two primary and/or secondary amino groups, a molecular weight of less than 400 and at least one anionic or potential anionic group and
    iii) up to 70 equivalent percent of an isocyanate reactive compound having a molecular weight of less than 400 and containing at least one primary or secondary amino group and at least one other isocyanate-reactive group,
  wherein the equivalent percents of component c) are based on the total equivalents of isocyanate-reactive groups present in component c) and wherein the polyurea contains an equivalent ratio of blocked isocyanate groups to unreacted isocyanate-reactive groups of 2:1 to 0.8:1, and II) reacting the polyisocyanate with components b) and c) to form an aqueous polyurea dispersion.

The present invention is also directed to the aqueous polyurea dispersion prepared by this process.

DETAILED DESCRIPTION OF THE INVENTION

In accordance with the present invention a "polyurea" is understood to mean a polymer containing urea groups and optionally urethane groups.

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water in the absence of large quantities of organic solvents, even if they are hydrophilically modified. High viscosities are also obtained if a significant portion the isocyanate groups of the polyisocyanate are blocked with a monofunctional blocking agent before they are dispersed in water.

Examples of suitable monomeric polyisocyanates include 1,6-hexamethylene diisocyanate, 1,12-dodecane diisocyanate, cyclobutane-1,3-diisocyanate, cyclohexane-1,3and/or -1,4-diisocyanate, 1-isocyanate-3,3,5-trimethyl-5-isocyanatomethyl cyclohexane (isophorone diisocyanate), 2,4-and/or 2,6-hexahydrotoluylene, diisocyanate, hexahydro-1,3- and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, napthalene-1,5-diisocyanate, triphenylmethane-4,4',4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the aqueous dispersions of the present invention may be used in their unmodified, hydrophobic form or they may be rendered hydrophilic by admixture, with external emulsifiers or by reaction with nonionic compounds containing isocyanate-reactive groups. The reaction components which ensure the dispersibility of the polyisocyanates include compounds containing lateral or terminal, hydrophilic ethylene oxide units.

Less preferred for providing hydrophilicity are compounds containing anionic or potential anionic groups, such as diols containing such groups. In accordance with the present invention anionic groups are incorporated into the aqueous polyurea dispersions after the polyisocyanate has been dispersed in water during the emulsion polymerization to provide additional storage stability. Accordingly, it is only necessary according to the invention to incorporate sufficient hydrophilicity into the polyisocyanates to enable them to be dispersed in water in the absence of solvents. It is not necessary to incorporate into the polyisocyanates sufficient hydrophilicity to enable the resulting aqueous polyurea dispersions to remain stably dispersed in water.

The reason for this is that the molecular weight and, thus, the viscosity of the polyisocyanate increases because of the incorporation of hydrophilic groups. If all of the hydrophilicity which is necessary for the aqueous polyurea dispersion to remain stably dispersed in water is incorporated into the polyisocyanate, then its viscosity may require the use of an organic solvent to disperse it in water.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate.

Hydrophilic components having terminal or lateral hydrophilic chains containing ethylene oxide units include compounds corresponding to the formulae

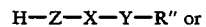

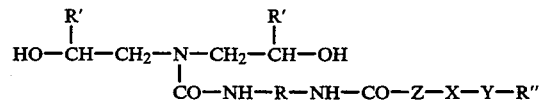

wherein
R represents a difunctional radical obtained by removing the isocyanate groups from a diisocyanate corresponding to those previously set forth,
R' represents hydrogen or a monovalent hydrocarbon radical containing from 1 to 8 carbon atoms, preferably hydrogen or a methyl group,
R" represents a monovalent hydrocarbon radical having from 1 to 12 carbon atoms, preferably an unsubstituted alkyl radical having from I to 4 carbon atoms,
X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units,
Y represents oxygen or —NR'"— wherein R'" has the same definition as R" and
Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing anionic groups or potential anionic groups for providing sufficient hydrophilicity to the polyisocyanates to enable them to be dispersed in water include carboxylate groups and sulphonate groups. The anionic groups are formed by neutralizing the corresponding potential anionic groups (free acid groups) either prior to, during or after their reaction with the polyisocyanate. When the potential anionic groups are neutralized prior to reaction with the polyisocyanate, anionic groups are incorporated directly. When neutralization is performed subsequent to reaction with the polyisocyanate, potential anionic groups are incorporated. Suitable compounds for incorporating the previously discussed carboxylate and sulphonate groups are described in U.S. Pat. Nos. 3,479,310, 4,108,814, and 3,412,054, the disclosures of which are herein incorporated by reference.

In addition to the previously discussed hydrophilic modifiers, which are chemically incorporated into the polyisocyanates, it is also possible to use external emulsifiers which may be anionic or nonionic. Further, when the polyisocyanate has a sufficiently low viscosity, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water have a functionality of 1.5 to 4.0, preferably 1.8 to 3.0. When dispersion stability is a specific requirement, the polyisocyanates preferably have a functionality of 1.5 to 2.5, more preferably 1.8 to 2.2. These modified polyisocyanates may be obtained by reacting polyisocyanates with monofunctional compounds, optionally containing hydrophilic groups, to obtain polyisocyanates having functionalities within these ranges. The reaction of the polyisocyanates with monofunctional compounds containing hydrophilic groups improves the stability of the aqueous polyurea dispersions but can limit the molecular weight of the fully reacted product after curing on a substrate, especially when the functionality is reduced below 2. It is also possible to reduce the functionalities of polyisocyanates by reacting them with monofunctional compounds which do not contain hydrophilic groups (such as low molecular weight monoalcohols).

The polyisocyanates to be dispersed in water preferably have a functionality of at least 2, more preferably at least 2.2. These compounds may also be prepared by reacting polyisocyanates having functionaities of greater than 2 with monofunctional compounds, optionally containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisccyanates with monofunctional compounds containing hydrophilic groups is less preferred since this reduces the functionality to less than 2, thereby limiting the molecular weight of the aqueous polyurea dispersions.

In accordance with the present invention it is possible to obtain dispersion stability and to ensure that the aqueous polyurea dispersions achieve a sufficiently high molecular weight, by controlling the functionality of the component containing hydrophilic groups and the functionality of the polyisocyanate.

The polyisocyanate dispersions generally have a solids content of about 2 to 60, preferably about 5 to 50 and more preferably about 10 to 30 weight percent.

After the polyisocyanate has been dispersed in water, it is reacted with components b) and c). Component b) is selected from monofunctional blocking agents which are more reactive with isocyanate groups than water. In a less preferred embodiment minor quantities of blocking agents which are not more reactive with isocyanate groups than water, such as aliphatic and aromatic monoalcohols, may be present. Examples of the more reactive blocking agents include secondary aromatic amines such as N-methylaniline; the N-methyl toluidines, N-phenyl toluidine and N-phenyl xylidene; N-alkyl amides such as N-methyl acetamide; imides such as succinimide; lactams such as ε-caprolactam and δ-valerolactam; mercaptans such as methylmercaptan, ethyl mercaptan, butyl mercaptan, 2-mercapto-benzothiazole and dodecyl mercaptan; triazoles such as 1H-1,2,4-triazole; preferably alkali metal bisulfites; and more preferably oximes.

The oximes preferably correspond to the formula

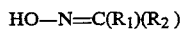

wherein
R₁ and R₂ may be the same or different and represent hydrogen or an alkyl or aralkyl group having 1 to 10 carbon atoms, provided that both R₁ and R₂ are not hydrogen, or the two groups together with the oxime carbon atom may form a cycloaliphatic ring containing 4 to 8 carbon atoms.

Suitable oxime blocking agents include methyl ethyl ketoxime, methyl isobutyl ketoxime, acetone oxime, cyclohexanone oxime and methyl n-amyl ketoxime, methyl n-propyl ketoxime, methyl isopropyl ketoxime, diethyl ketoxime, methyl sec-butyl ketoxime, ethyl butyl ketoxime and acetophenone oxime.

Amine component i) is selected from polyamines having two or more, preferably 2 to 4, primary and/or secondary amino groups and a molecular weight of at least 1000, preferably 1000 to 5000 and more preferably 1200 to 3000. In cases where the functionality of the polyisocyanate is greater than 2.5, it may be necessary to replace a portion of the polyamine with a monamine to improve dispersion stability. The amino groups may aliphatically-, cycloaliphatically-, araliphatically- or aromatically-bound.

Suitable polyamines include those obtained by hydrolyzing NCO prepolymers having isocyanate group contents of 0.5 to 40% by weight. Preferably, these polyamines are prepared by initially reacting a polyether containing two to four hydroxyl groups with an excess of a polyisocyanate to form an NCO prepolymer and then converting the isocyanate groups to amine groups by hydrolysis. Processes for the production of useful polyamines via isocyanate hydrolysis techniques are known and are described in U.S. Pat. Nos. 4,386,318, 4,456,730, 4,472,568, 4,501,873, 4,515,923, 4,525,534, 4,540,720, 4,578,500 and 4,565,645, European Patent 0,097,299 and German Offenlegungsschrift 3,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595. In the event that a basic material is used during the hydrolysis of the amine which would act as a trimerization catalyst, and if that basic material is not removed once the hydrolysis reaction is complete, then an acidic material, such as benzoyl chloride, should be added either before or shortly after the polyamine and polyisocyanate are admixed.

Also useful are compounds prepared by reacting the corresponding polyol with a halogenated nitrobenzene compound such as o- or p-nitrochlorobenzene, or dinitrochlorobenzene, followed by the reduction of the nitro group(s) to the amine, as described in U.S. application Ser. No. 07/183,556, filed on Apr. 19, 1988 and in published European Patent Application 0,268,849, published Jun. 1, 1988. Also useful are the polyamines prepared by reacting a polyol with an acetoacetate and thereafter with an amine as described in U.S. application Ser. No. 07/523,769 and U.S. Pat. No. 5,066,824, the disclosures of which are herein incorporated by reference.

Instead of, or, in addition to the high molecular weight amines noted above, polyoxyalkylene polyamines may be used. Such polyamines are known in the art. One method for preparing such amines is the amination of polyhydroxy polyethers (e.g., polypropylene glycols) by a reaction with ammonia in the presence of Raney nickel and hydrogen (Belgian patent 634,741). U.S. Pat. No. 3,654,370 discloses the preparation of polyoxyalkylene polyamines by the reaction of the corresponding polyol with ammonia and hydrogen in the presence of a nickel, copper, or chromium catalyst. The preparation of polyethers containing amino end groups by the hydrogenation of cyanoethylated polyoxyalkylene ethers is described in German Patent 1,193,671. Other methods of preparation of polyoxyalkylene polyamines are described in U.S. Pat. Nos. 3,155,728 and 3,236,895, and French Patent 1,551,605. Commercially available polyether polyamines are sold by Texaco under the Jeffamine tradename.

Amine component ii) is present to provide additional hydrophilicity to the aqueous polyurea dispersion. Suitable compounds include those having two or more, preferably 2 to 4, primary and/or secondary amino groups, a molecular weight of less than 400, and at least one anionic group. Suitable anionic groups are sulfonate and carboxylate groups, preferably sulfonate groups. Amino sulfonates and amino carboxylates are disclosed in U.S. Pat. No. 4,379,410, the disclosure of which has previously been incorporated by reference.

Preferred amino sulfonates are those corresponding to the formula

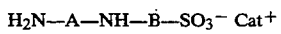

H$_2$N—A—NH—B—SO$_3^-$ Cat$^+$ wherein
A and B represent aliphatic hydrocarbon radicals having 2 to 6 carbon atoms, preferably ethylene radicals and
Cat$^+$ represents an alkali metal or optionally substituted ammonium cation, preferably a sodium or potassium cation and more preferably a sodium cation.

As previously discussed with regard to the optional incorporation of potential anionic groups into the polyisocyanate component, it is also possible to use compounds containing potential anionic groups as amine component ii). For example, amino sulfonic or carboxylic acids may be blended with water prior to neutralization of the acid groups. The neutralizing agent may be present in water at the time of dispersion or may be added shortly thereafter. If the polyisocyanate component is already present in water at the time of addition of amine component ii), it is preferred that the neutralizing agent be present in the water at the time of dispersion. More preferably, amine component ii) contains anionic groups before it is added to water when the polyisocyanate component has previously been added.

Amine component iii) is optional in accordance with the present invention because the purpose of this component can also be satisfied by amine components i) and/or ii), under certain circumstances which will be discussed hereinafter. Suitable compounds for use as amine component iii) are compounds having a molecular weight of less than 400 and containing at least one primary or secondary amino group and at least one other isocyanate-reactive group which may be a primary or secondary amino group or a hydroxyl group. Examples of these compounds are polyamines and aminoalcohols.

Primary or secondary monoamines containing at least one, preferably one or two, hydroxyl groups are disclosed in copending application, Ser. No. 07/676,670, filed Mar. 28, 1991 (the disclosure of which is herein incorporated by reference). Suitable monoamines include those which correspond to the formula

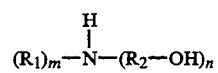

$$(R_1)_m-\overset{H}{N}-(R_2-OH)_n$$

wherein
R$_1$ represents hydrogen or an alkyl, cycloalkyl, araliphatic or aromatic group having up to 15 carbon atoms, preferably an alkyl group containing 1 to 6 carbon atoms,
R$_2$ is an optionally branched alkylene group containing 1 to 12, preferably 1 to 4 carbon atoms,
m represents 0 or 1,
n represents 1 or 2 and
m+n=2.

Examples of suitable monoamines include ethanolamine, propanolamine, butanolamine, N-methylethanolamine, N-ethylethanolamine, N-propylethanolamine, N-butyl-ethanolamine, N-methylpropanolamine, N-ethyl-propanolamine, N-propylpropanolamine, N-butyl-propanolamine, N-methylbutanolamine, N-ethyl-butanolamine, N-propylbutanolamine, N-butyl-butanolamine, diethanolamine, dipropanolamine, dibutanolamine, and N-ethanol-N-propanolamine. Especially preferred are ethanolamine and diethanolamine, which in addition to good performance, are inexpensive and readily available.

Also suitable as aminoalcohols are alkoxylation products of diamines or polyamines, provided that they contain at least one primary or secondary amino group. Examples of these are N,N,N'-tris-hydroxyethyl-ethylene diamine and N-hydroxyethyl-ethylene diamine.

The polyamines which are suitable for use as amine component iii) are disclosed in U.S. Pat. No. 4,701,480, the disclosure of which is herein incorporated by reference. Preferably, isocyanate-reactive component iv) is an aminoalcohol because when using these compounds it is possible to react all of the isocyanate-reactive compounds in one step as discussed hereinafter.

In accordance with the present invention component b) is present in an amount of 10 to 70 equivalent percent, preferably 20 to 60 equivalent percent and more preferably 30 to 50 equivalent percent, based oil the isocyanate groups of component a). Component i) of amine component c) is present in an amount of 2 to 55 equivalent percent, preferably 5 to 40 equivalent percent; amine component ii) is present in an amount of 5 to 70 equivalent percent, preferably 10 to 40 equivalent percent; and amine component iii) is present in an amount of up to 70 equivalent percent, preferably 10 to 70 equivalent percent, more preferably 20 to 60 equivalent percent, and most preferably 30 to 50 equivalent percent, wherein the equivalent percents of components i), ii) and iii) are based on the total equivalents of isocyanate-reactive groups present in component c). In a preferred embodiment the equivalents of blocking agent correspond to the equivalents of unreacted isocyanate-reactive groups, more preferably the equivalents of hydroxy groups, present in the polyurea dispersion.

The amounts of components a) and c) are chosen to provide the polyurea with an equivalent ratio of blocked isocyanate groups to unreacted isocyanate-reactive groups of 2:1 to 0.8:1, preferably 1.5:1 to 0.9:1 and more preferably 1.2:1 to 0.95:1. The presence of an excess of blocked polyisocyanate groups to unreacted isocyanate-reactive groups in the aqueous polyurea dispersion is not objectionable because when unblocked the isocyanate groups can react with water, with urea groups in the polymer chain or an optionally added isocyanate-reactive component such as a polyol, e.g., butane diol. To the contrary an excess of unreacted isocyanate-reactive groups is not detrimental, but does not provide any advantages.

In order to prepare the aqueous polyurea dispersions according to the present invention, components b) and c) may be added to the water separately or in admixture either before, during or after the polyisocyanate has been dispersed. Components b) and c) may be reacted with the polyisocyanate in either a one-step or multi-step process. In the multi-step process the aqueous polyurea dispersion in addition to containing blocked isocyanate groups may also contain either amino groups and/or hydroxyl groups. In the one-step process the aqueous polyurea dispersion generally only contains hydroxyl groups in addition to the blocked isocyanate groups. This is because in the one-step process, amine component iii) is preferably an aminoalcohol.

In the one-step process components b) and c) are reacted with the dispersed polyisocyanate in one step, i.e., the components are not reacted sequentially. The amino groups of amine components i), ii) and iii) and the blocking agent of component b) preferentially react with the isocyanate groups before the hydroxyl groups of amine component iii) and water. In accordance with the one-step reaction process it is not preferred to use diamines as amine component iii) because they will react with the available isocyanate groups faster than the blocking agent resulting in a product which contains an insufficient quantity of blocked isocyanate groups, an insufficient quantity of isocyanate-reactive groups and unnecessary unincorporated blocking agent.

In the multi-step process, preferably a two-step process, the components b) and c) are not reacted simultaneously with the dispersed polyisocyanate. Generally, the multi-step process is used when it is desired to incorporate amino groups into the aqueous polyurea dispersion, although it is possible to incorporate hydroxyl groups using this process. In the multi-step process the blocking agent, which is generally less reactive with isocyanate groups than amino groups of amine component c), is reacted with the dispersed polyisocyanate in the first step. In the second or additional steps amine components i), ii) and iii) are reacted with the polyisocyanate. An excess of amino groups, based on the isocyanate groups available after the blocking reaction, is used. The excess amino groups may be provided by amine components i), ii) and/or iii). The amino groups which do not react with isocyanate groups remain for subsequent reaction with the blocked isocyanate groups.

If it is attempted to prepare the same type of product by the one-step process, then the excess amino groups react with the isocyanate groups before the blocking agent. It is possible to react a portion of the amino groups with the polyisocyanate in the first step of the multi-step process, provided that sufficient isocyanate groups are available to react with the blocking agent.

When component c) is hydrophobic and added to water either before or after, preferably before, the addition of the polyisocyanate, it may be necessary to add a small amount of an external emulsifier, i.e., up to about 10%, based on the weight of the particular component, in order to maintain the component stably dispersed, e.g., during the, introduction of the polyisocyanate. If the polyisocyanate is added to water prior to the addition of component c), or if this component contains chemically incorporated hydrophilic groups, e.g., when using polyamines prepared from NCO prepolymers containing such hydrophilic groups, it may not be necessary to add an external emulsifier. It may also not be necessary to add an external emulsifier when the amine components i), ii) and iii) are added to water in admixture because the hydrophilicity of amine component ii) will assist the dispersion of the remaining components.

The polyisocyanate and components b) and c), especially amine components i), ii) and iii), should not be admixed prior to being dispersed in water because they will immediately begin to react resulting in a sometimes rapid increase in viscosity before the mixture can be dispersed in water.

If amine components i), ii) and iii) are directly added to the dispersed polyisocyanate, it is possible that they will react with the polyisocyanate before they have been dispersed throughout the mixture- This results in the formation of lumps or large particles in the dispersion. To avoid this problem it is preferred to mix the amine components with water before mixing them with the dispersed polyisocyanate (if the polyamine is hydrophobic, an external emulsifier may also be present), in order to reduce the concentration of the polyamine and enable it to be more quickly and homogeneously mixed with the dispersed polyisocyanate.

In the most preferred embodiment of the present invention the aqueous polyurea dispersions are prepared in a one-step reaction using aminoalcohols as amine component iii). In accordance with this embodiment the ratio of blocked isocyanate groups to unreacted isocyanate-reactive groups can be approximated from the ratio of monofunctional blocking to hydroxyl groups of the aminoalcohol. During the reaction the isocyanate groups of the dispersed polyisocyanate react with the blocking agent and the amino groups of amine components i), ii) and iii). The hydroxyl groups remain essentially unreacted and, thus, are present to react with the blocked isocyanate groups when they are subsequently heated and unblocked.

In accordance with the present invention, it is also possible to incorporate additives into the aqueous polyurea dispersions. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The aqueous polyurea dispersions may be used in any of the applications previously disclosed for aqueous polyurethane or polyurethane-urea dispersions, and are especially suitable as binders for fiberglass.

The invention is further illustrated but is not intended to be limited by the following examples in which all parts and percentages are by weight unless otherwise specified.

EXAMPLES

The following testing procedures were used throughout the examples:

Film Pencil Hardness—ASTM D3363

Film Adhesion to Tape Test—ASTM D3359-83

Film MEK Double Rubs—Number of double rubs with a cotton cheese cloth saturated with MEK that were necessary to begin to remove the coating from the glass plate.

Film Water Spot Sensitivity—One drop of water was placed on the coating for one hour, then the film is checked to see if the water had any effect. If the film had a haze or was easier to remove from the glass where the water spot was, it was considered sensitive.

Dogbone Tensile Test—The dogbones were prepared from glass beads (glass bead abrasive MS-M, manufactured by Cataphate Inc. and distributed by Frick & Lindsay Company) and a water dispersible binder. The binder was applied at about 3-6% resin solids on glass beads using an approximately 35% solids solution of the binder. The glass beads and resin were mixed well (consistency of mortar), then packed into a dogbone mold (cross-section at break point—approximately 23mm×4mm). The dogbones were oven cured at 150° C. for 45 minutes and after curing for 6-8 days were tested on an Instron Tester. The cross-head speed was set at 0.5 inches per minute.

Gel-Stroke Test—Two milliliters of resin solution {25–40% solids) were placed on a 150° C. hotplate. The resin was contacted repeatedly with a wooden applicator stick. The endpoint was considered to be the time at which it was no longer possible to pull strings of the material from the curing mass.

EXAMPLE 1

Preparation of an Aromatic Water Dispersible Polyisocyanate

A three liter round bottom flask equipped with a thermometer, drying tube, condenser, and stirrer was charged with 675 parts of Crude MDI[1] and 175 parts of a monofunctional poly(oxyethylene) ether[2]. The temperature of the reaction flask was increased to 70° C. The reaction proceeded at this temperature for three hours at which time the isocyanate content, determined by titration, was 24.9% (theoretical NCO=25.1%). The modified polyisocyanate was cooled to ambient temperature and placed in dry containers.

[1] An aniline/formaldehyde condensation product containing 4,4'-diphenylmethane diisocyanate and about 50% of higher functionality homologs, having an isocyanate content of about 31.5% and a viscosity at 25° C. of 200 mPa.s.
[2] A polyether monohydric alcohol having a molecular weight of 2200 and prepared from n-butanol, ethylene oxide and propylene oxide (molar ratio of ethylene oxide to propylene oxide—83:17).

EXAMPLE 2

Preparation of a Storage Stable, Reactive Polyurea Dispersion Containing Sulfonate Groups 80 grams of the water-dispersible polyisocyanate of Example 1 were dispersed under agitation into a two liter resin flask containing 196.5 grams of demineralized water at ambient temperature. To the dispersed isocyanate was added a mixture of 21.9 grams of butanone oxime (MEKO), 9.0 grams of a 46% solution of the sodium salt of N-(2-aminoethyl)-2-amino-ethanesulfonic acid dissolved in water, 13.2 grams of diethanolamine, 30 grams of a 2000 MW amine-terminated polyoxypropylene glycol (Jeffamine D-2000, available from Texaco Chemical Company), 3 grams of γ-aminopropyl-triethoxysilane (A-1100, available from Union Carbide Corporation), 2.0 grams of an external emulsifier (Sulfonic N-300, an ethoxylated nonyl phenol having a molecular weight of 1540 and available from Union Carbide Corporation), and 30 grams of demineralized water. The milky white dispersion had a viscosity of 30 mPa.s at room temperature and a pH of 7.8. To a portion of the dispersion was added 0.05% of a silicone containing flow agent (Silwet L-77, available from Union Carbide Corporation). A film prepared from the mixture (5 mils wet on glass, oven cured at 150° C. for 45 minutes) was cloudy, yellow and continuous. It had a pencil hardness of 2H, adhesion to tape test of 5B, dogbone tensile test of 852 psi (5% solid resin on glass), gel-stroke of 3 minutes, and was very slightly sensitive to the water spot test.

EXAMPLE 3 (Comparison)

Preparation of a Reactive Polyurea Dispersion 82.3 grams of the water dispersible polyisocyanate of Example I were dispersed under agitation into a two liter resin flask containing 200.55 grams of demineralized water at ambient temperature. To the dispersed isocyanate was added a mixture of 21.9 grams of butanone oxime (MEKO), 1.3 grams of ethylene diamine, 13.2 grams of diethanolamine, 30 grams of a 2000 MW amine-terminated polyether described in Example 2, 3.0 grams of adhesion promoter described in Example 2, 2.0 grams of the external emulsifier described in Example 2, and 30 grams of demineralized water. The mixture became very stringy and the organic mass separated quickly from the aqueous phase.

EXAMPLE 4

Preparation of a Storeage Stable, Reactive Polyurea Dispersion Containing Sulfonate Groups 80 grams of the water dispersible polyisocyanate of Example 1 were dispersed under agitation into a two liter resin flask containing 396 grams of demineralized water at ambient temperature. To the dispersed isocyanate was added a mixture of 17.4 grams of butanone oxime (MEKO), 16.5 grams of a 46% solution of the sodium salt of N-(2-aminoethyl)-2-amino-ethanesulfonic acid dissolved in water, 10.5 grams of diethanolamine, 1.24 grams of ethylenediamine, 30 grams of the amine-terminated poly described in Example 2, 6.0 grams of the external emulsified described in Example 2, 3.1 grams of the adhesion promoter described in Example 2, and 62 grams of demineralized water. The dispersion had a viscosity of 10 mPa.s at 25° C. and a pH of 8.8. To a portion of the dispersion was added 0.05% of the silicone containing flow agent described in Example 2. A film prepared from the mixture (5 mils wet on glass, oven cured at 150° C. for 45 minutes) was cloudy, yellow and continuous. It had an adhesion to tape test of 4B, dogbone tensile test of 277 psi (3.7% solid resin on glass), and was slightly sensitive to the water spot test.

EXAMPLE 5

Preparation of Aliphatic Water-dispersible Polyisocyanate

A one liter round bottom flask equipped with a thermometer, drying tube, condenser, and stirrer was charged with 675 grams of an isocyanurate group-containing polyisocyanate[4] and 175 grams of the monofunctional poly(oxyethylene) ether described in Example 1. The temperature of the reaction was increased to 100° C. The reaction proceeded at this temperature for four hours at which time the isocyanate content was determined by titration to be 16.3% {theoretical NCO = 16.6%). The viscosity of the prepolymer was 3300 mPa.s at 25° C. The modified polyisocyanate was cooled to ambient temperature: and placed in dry containers.

[4] An isocyanurate group-containing polyisocyanate prepared by trimerizing a portion of the isocyanate groups of 1,6-hexamethylene diisocyanate and having an isocyanate content of 21.6% by weight, a content of monomeric diisocyanate of <0.2% and a viscosity at 20° C. of 3000 mPa.s.

EXAMPLE 6

Preparation of a Storage Stable, Reactive Polyurea Dispersion Containing Sulfonate Groups 100 grams of the water dispersible polyisocyanate of Example 5 were dispersed under agitation into a two liter resin flask containing 211.5 grams of demineralized water at ambient temperature. To the dispersed isocyanate was added a mixture of 16.6 grams of butanone oxime (NEKO), 9.2 grams of a 46% solution of the sodium salt of N-(2-aminoethyl)-2-amino-ethanesulfonic acid dissolved in water, 10.0 grams of diethanolamine, 24.9 grams of the amine-terminated polyoxypropylene glycol described in Example 2, 3.2 grams of the adhesion promoter described in Example 2, 2.0 grams of the external emulsifier described in Example 2, and 24.9 grams of demineralized water. The dispersion had a viscosity of 250 mPa.s at 30° C. and a pH of 7.5. To a portion of the dispersion was added 0.05% of the silicone containing flow agent described in Example 2. A film prepared from the mixture (5 mils wet on glass, oven cured at 150° C. for 45 minutes) was cloudy and continuous. It had a pencil hardness of 4B, adhesion to tape test of 5B, dogbone tensile test of 245 psi (5.3% solid resin on glass), gel-stroke of 12 minutes, and was very slightly sensitive to the water spot test.

EXAMPLE 7

Preparation of a Storage Stable, Reactive Polyurea Dispersion Containing Carboxylate Groups 60 grams of the water dispersible polyisocyanate of Example 1 were dispersed under agitation into a two liter resin flask containing 313.67 grams of demineralized water at ambient temperature. To the dispersed isocyanate was added a mixture of 15.97 grams of butanone oxime {MEKO), 66.34 grams of a solution of the sodium salt of L-lysine (prepared from 35 grams of L-lysine mono-hydrochloride, 15.33 grams of sodium hydroxide and 150.99 grams of demineralized water), 6.32 grams of diethanolamine, 21.87 grams of the amine-terminated polyoxypropylene glycol described in Example 2, 2.19 grams of the adhesion promoter described in Example 2, and 1.46 grams of the external emulsifier described in Example 2. The dispersion had a viscosity of 90 mPa.s at 30° C. and a pH of 9.5. To a portion of the dispersion was added 0.05% of the silicone containing flow agent described in Example 2. A film prepared from the mixture (5 mils wet on glass, oven cured at 150° C. for 45 minutes) was cloudy and continuous. It had a pencil hardness of 2H, adhesion to tape test of 5B, dogbone tensile test of 468 psi (3.74% solid resin on glass), gel-stroke of 2 minutes, and was sensitive to the water spot test.

EXAMPLE 8

Preparation of the Sodium Salt of N-(2-aminoethyl)-3-amino-propionic Acid

Three solutions were prepared:
A 20 grams of ethylene diamine in 60 grams of demineralized water,
B 24.02 grams acrylic acid in Z2 grams of demineralized water and
C 13.33 grams of sodium hydroxide in 40 grams of demineralized water.

Solution B was added to solution C under agitation at room temperature. This mixture was then added to solution A under agitation and stirred at room temperature for 16 hours. Analysis of the product by NMR and IR spectroscopy demonstrate that the product contained mainly the sodium salt of N-(2-aminoethyl)-3-amino-propionic acid.

EXAMPLE 9

Preparation of a Storage Stable, Reactive Polyurea Dispersion Containing Carboxylate Groups 82.3 grams of the water dispersible polyisocyanate of Example 1 were dispersed under agitation into a two liter resin flask containing 329.6 grams of demineralized water at ambient temperature. To the dispersed isocyanate was added a mixture of 21.9 grams of butanone oxime {MEKO), 60.0 grams of the solution of the sodium salt of N-(2-aminoethyl)-3-aminopropionic acid from Example 8, 8.6 grams of diethanolamine, 30.0 grams of the amine-terminated polyoxypropylene glycol described in Example 2, 3.0 grams of the adhesion promoter described in Example 2, and 2.0 grams of the external emulsifier described in Example 2. The dispersion had a viscosity of 10 mPa.s at 30° C. and a pH of 9.7. To a portion of the dispersion was added 0.05% of the silicone containing flow agent described in Example 2. A film prepared from the mixture (5 mils wet on glass, oven cured at 150° C. for 45 minutes) was cloudy and continuous. It had a pencil hardness of HB, adhesion to tape test of 5B, dogbone tensile test of 403 psi (4.6% solid resin on glass), gel-stroke of 1.5 minutes, and was sensitive to the water spot test.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of an aqueous polyurea dispersion containing blocked isocyanate groups and unreacted isocyanate-reactive groups selected from primary and secondary amino groups and hydroxyl groups which comprises
   I) dispersing in water
      a) a polyisocyanate which has an average functionality of 1.5 to 4.0 and an isocyanate content of at least 12% by weight,
      b) 10 to 70 equivalent percent, based on the isocyanate groups of component a), of a monofunctional blocking agent which is more reactive with isocyanate groups than water and
      c) an amine component containing
         i) 2 to 55 equivalent percent of a polyamine having at least two primary and/or secondary amino groups and a molecular weight of at least 1000,
         ii) 5 to 70 equivalent percent of a polyamine having at least two primary and/or secondary amino groups, a molecular weight of less than 400 and at least one anionic or potential anionic group and
         iii) up to 70 equivalent percent of an isocyanate-reactive compound having a molecular weight of less than 400 and containing at least one primary or secondary amino group and at least one other isocyanate-reactive group selected from primary and secondary amino groups and hydroxyl groups,
      wherein the equivalent percents of component c) are based on the total equivalents of isocyanate-reactive groups present in component c) and wherein the polyurea contains an equivalent ratio of blocked isocyanate groups to said unreacted isocyanate-reactive groups of 2:1 to 0.8:1, and
   II) reacting the polyisocyanate with components b) and c) to form an aqueous polyurea dispersion.

2. The process of claim 1 wherein said dispersed polyisocyanate is rendered hydrophilic by reaction with a compound containing a lateral or terminal nonionic hydrophilic group.

3. The process of claim 1 wherein component i) comprises an aminated polyether.

4. The process of claim 2 wherein component i) comprises an aminated polyether.

5. The process of claim I wherein one or more of amine components i), ii) and iii) are dispersed in water in the presence of 0.1 to 10% by weight, based on the weight of the amine component c), of an external emulsifier.

6. The process of claim 1 wherein amine component iii) is present in an amount of 10 to 70 equivalent percent.

7. The process of claim 6 wherein one or more of the amine components i), ii) and iii) are dispersed in water in the presence of 0.1 to 10% by weight, based on the weight of the amine component c), of an external emulsifier.

8. The process of claim 6 wherein said other isocyanate-reactive group of amine component iii) is a hydroxy group.

9. An aqueous polyurea dispersion containing blocked isocyanate groups and unreacted isocyanate-reactive groups selected from primary and secondary amino groups and hydroxyl groups which is prepared by a process which comprises
   I) dispersing in water
      a) a polyisocyanate which has an average functionality of 1.5 to 4.0 and an isocyanate content of at least 12% by weight,
      b) 10 to 70 equivalent percent, based on the isocyanate groups of component a), of a monofunctional blocking agent which is more reactive with isocyanate groups than water and
      c) an amine component containing
         i) 2 to 55 equivalent percent of a polyamine having at least two primary and/or secondary amino groups and a molecular weight of at least 1000,
         ii) 5 to 70 equivalent percent of a polyamine having at least two primary and/or secondary amino groups, a molecular weight of less than 400 and at least one anionic or potential anionic group and
         iii) up to 70 equivalent percent of an isocyanate-reactive compound having a molecular weight of less than 400 and containing at least one primary or secondary amino group and at least one other isocyanate-reactive group selected from primary and secondary amino groups and hydroxyl groups,
      wherein the equivalent percents of component c) are based on the total equivalents of isocyanate-reactive groups present in component c) and wherein the polyurea contains an equivalent ratio of blocked isocyanate groups to said unreacted isocyanate-reactive groups of 2:1 to 0.8:1, and
   II) reacting the polyisocyanate with components b) and c) to form an aqueous polyurea dispersion.

10. The aqueous polyurea dispersion of claim 9 wherein said dispersed polyisocyanate is rendered hydrophilic by reaction with a compound containing a lateral or terminal nonionic hydrophilic group.

11. The aqueous polyurea dispersion of claim 9 wherein component i) comprises an aminated polyether.

12. The aqueous polyurea dispersion of claim 10 wherein component i) comprises an aminated polyether.

13. The aqueous polyurea dispersion of claim 9 wherein one or more of amine components i), ii) and iii) are dispersed in water in the presence of 0.1 to 10% by weight, based on the weight of the amine component c), of an external emulsifier.

14. The aqueous polyurea dispersion of claim 9 wherein amine component iii) is present in an amount of 10 to 70 equivalent percent.

15. The aqueous polyurea dispersion of claim 14 wherein one or more of amine components i), ii) and iii) are dispersed in water in the presence of 0.1 to 10% by weight, based on the weight of the amine component c), of an external emulsifier.

16. The aqueous polyurea dispersion of claim 14 wherein said other isocyanate-reactive group of amine component iii) is a hydroxy group.

* * * * *